UNITED STATES PATENT OFFICE.

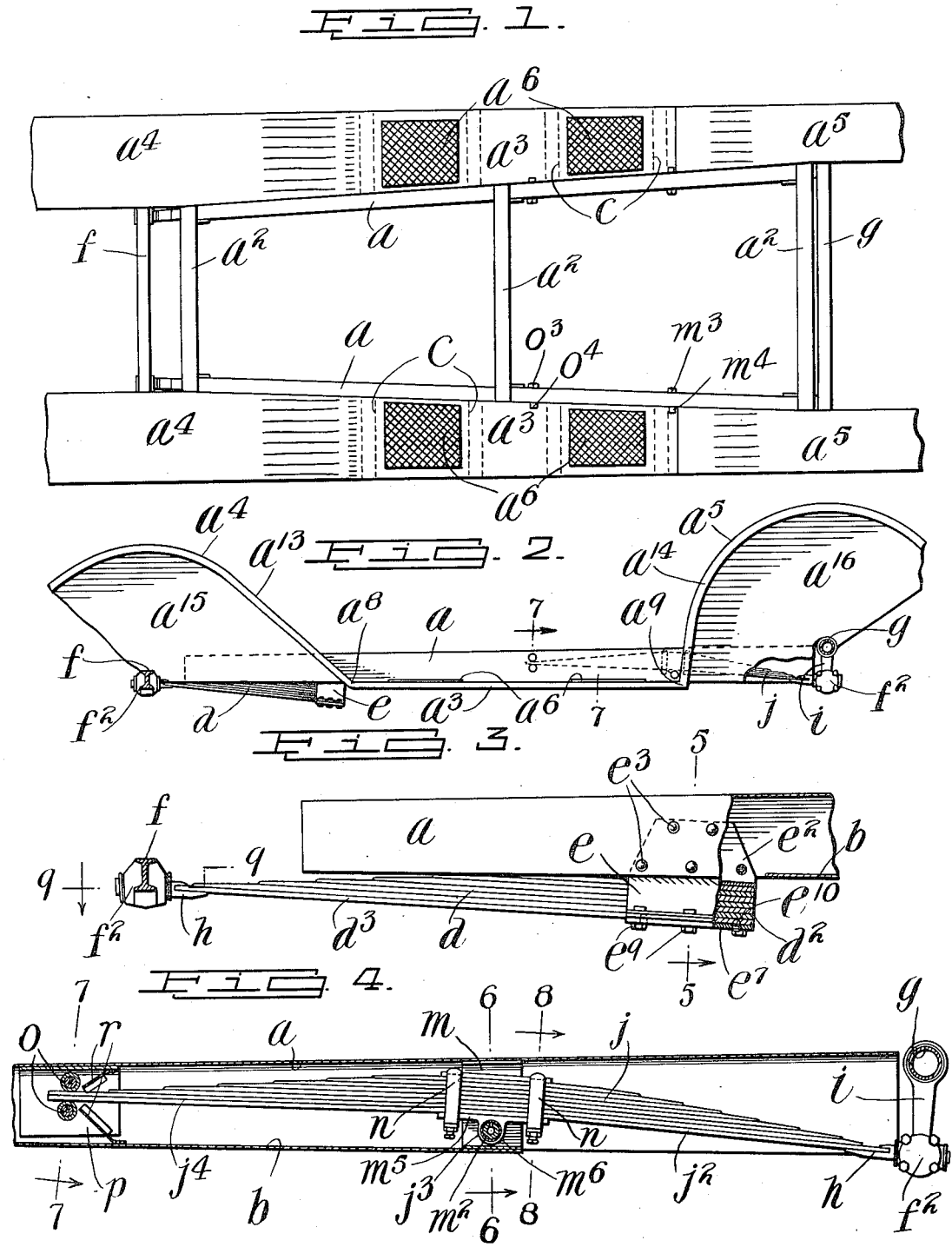

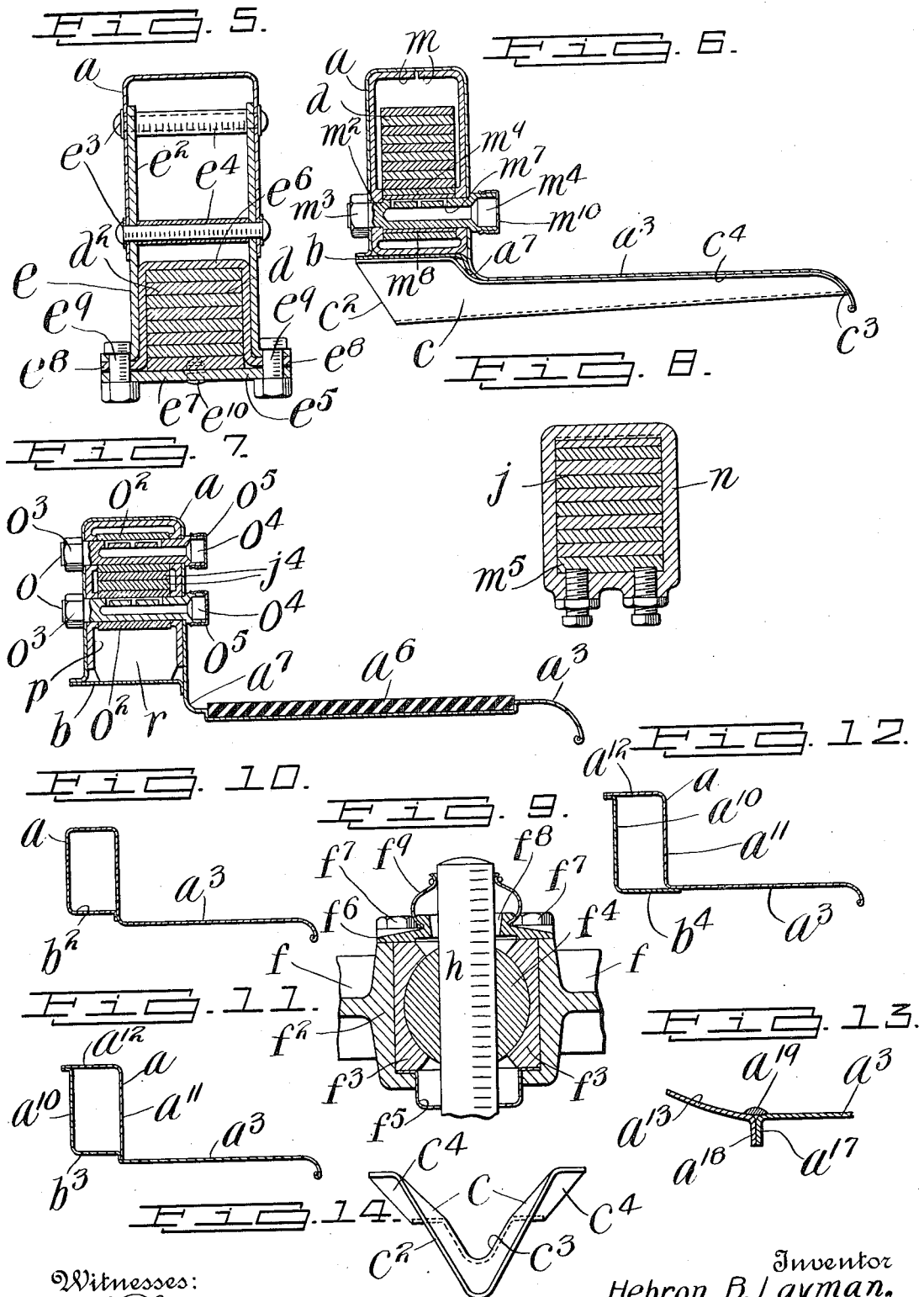

HEBRON B. LAYMAN, OF NEW YORK, N. Y., ASSIGNOR OF ONE-HALF TO FRANK E. LONAS, OF NEW YORK, N. Y.

AUTOMOBILE.

1,142,337. Specification of Letters Patent. Patented June 8, 1915.

Application filed October 20, 1913. Serial No. 796,137.

*To all whom it may concern:*

Be it known that I, HEBRON B. LAYMAN, a citizen of the United States, and residing at New York, in the county of New York and State of New York, have invented certain new and useful Improvements in Automobiles, of which the following is a specification, such as will enable those skilled in the art to which it appertains to make and use the same.

This invention relates to automobiles or power driven vehicles, and particularly to the chassis or truck frame thereof, and the object of the invention is to provide a chassis or frame for vehicles of this class in which the side bars or rails thereof are made hollow in order to receive the side springs which are placed therein and operate therein and are covered and protected thereby, and whereby the chassis or frame including the springs may be made narrower than usual; a further object being to provide improved means for mounting, supporting and connecting the side springs, both front and back so as to facilitate the operation thereof and render the same more strong and durable; a still further object being to provide an automobile construction in which the chassis or truck frame is supported by springs connected therewith and having a universal joint connection with the front and rear axles.

My invention also involves a new construction and combination of the side bars or rails of the chassis or truck frame and the running boards at the opposite sides thereof, as hereinafter described; and the invention is fully disclosed in the following specification of which the accompanying drawings form a part, in which the separate parts of my improvement are designated by suitable reference characters in each of the views, and in which;—

Figure 1 is a plan view of the chassis or truck frame of an automobile constructed according to my invention, the front and rear axles thereof being also indicated;— Fig. 2 a side view thereof with part of the construction broken away and in section;— Fig. 3 a view similar to Fig. 2, but showing only the front end portion of the chassis or truck frame and showing the same on an enlarged scale with part of the construction in section;—Fig. 4 a view similar to Fig. 2 but showing only the rear end portion of the chassis or truck frame, and showing said portion in longitudinal section;—Fig. 5 a section on the line 5—5 of Fig. 3 and on an enlarged scale;—Fig. 6 a section on the line 6—6 of Fig. 4 and on an enlarged scale;— Fig. 7 a section on the line 7—7 of Fig. 4, or on 7—7 of Fig. 2, and on an enlarged scale;—Fig. 8 a partial section on the line 8—8 of Fig. 4 and on an enlarged scale;— Fig. 9 a section on the line 9—9 of Fig. 3 and on an enlarged scale;—Figs. 10, 11 and 12, transverse sectional views showing modified forms of one of the side bars or rails of the chassis or truck frame and corresponding running board;—Fig. 13 a sectional view showing a modified form or construction for connecting one of the mud guards with the corresponding running board, and;—Fig. 14 an inner end view of a running board brace or support which I employ, and showing the same detached, and a longitudinal side view of which is given in Fig. 6.

In the accompanying drawings, reference being made to Fig. 1, I have shown my improved chassis or truck frame which comprises side bars or rails $a$ connected by cross bars $a^2$ arranged at the front and rear ends thereof and centrally thereof, and said frame is provided with the usual side running boards $a^3$ and front and rear wheel mud guards $a^4$ and $a^5$.

The side bars or rails $a$ of the chassis or truck frame are formed from sheet metal and made hollow and are also preferably U-shaped in cross section and open downwardly, as shown in Fig. 5, except where and when they are closed at the bottom by plates $b$, this closure of the bottom of said side bars or rails, or a part thereof, being not an essential feature. The said running boards $a^3$ are preferably provided with the usual step pieces $a^6$ of rubber or any other suitable material, and said running boards are preferably formed integrally with the outer side portions of the bars or rails $a$, as shown at $a^7$ in Figs. 6 and 7, and are also provided with transverse bottom braces $c$, as shown in Figs. 6 and 14, said bottom braces being also formed of sheet metal and being V-shaped in cross section and being tapered from the inner end portion $c^2$ thereof to the outer end portion $c^3$ and being provided with side flanges $c^4$.

The opening in the bottom of the side portions or rails $a$ is preferably closed, as hereinbefore stated, for the full length of the running boards $a^3$, or between the points $a^8$ and $a^9$, in Fig. 2, and this may be done by the separate plate or plates $b$, shown in Figs. 4, 6 and 7, or it may be done by forming the plate or plates $b$ integrally with the inner side portions of the bars or rails $a$, as shown at $b^2$ in Fig. 10, or the bars or rails $a$ may be formed of separate parts, as shown in Fig. 11, the inner sides $a^{10}$ and the bottom or closure plates $b^3$ and the running boards $a^3$ being integral, while the outer sides $a^{11}$ and the top portions $a^{12}$ are also formed integrally and connected with the parts $a^{10}$, $b^3$ and $a^3$; or said rails or bars may be formed, as shown in Fig. 2, in which the running boards $a^3$, and the outer top and side portions $a^{11}$ and $a^{12}$ are formed integrally, and the inner side portions $a^{10}$ and the bottom closure plates $b^4$ are formed integrally and connected with the parts $a^3$, $a^{11}$ and $a^{12}$.

The mud guards $a^4$ and $a^5$ consist of crown portions $a^{13}$ and $a^{14}$ and back plates $a^{15}$ and $a^{16}$, and the crown portions $a^{13}$ and $a^{14}$ may be formed integrally with the running boards $a^3$, or they may be formed separately and connected therewith in any desired manner, preferably as shown in Fig. 13, in which the ends of the running boards are provided with downwardly directed flanges $a^{17}$, and the corresponding ends of the crown portions of the mud guards with a similar downwardly directed flange $a^{18}$, and these flanges may be connected in any desired manner, and placed transversely over this connection of the running boards and the crown portions of the mud guards is a transverse molding strip $a^{19}$.

The front side springs $d$ are of the usual form, and the rear end portions $d^2$ thereof are secured in hangers $e$ secured in and suspended from the side rails or bars $a$, as clearly shown in Figs. 3 and 5. The hangers $e$ comprise side plates $e^2$ secured in the rails or bars $a$ by bolts $e^3$ on which are mounted sleeves $e^4$, and in the lower ends of the plates $e^2$ are secured keepers $e^5$ in which the rear or butt ends $d^2$ of the springs $d$ are secured, said keepers $e^5$ consisting of top yoke-shaped members $e^6$ and bottom plates $e^7$ secured thereto, said yoke-shaped members $e^6$ and bottom plates $e^7$ being provided with side flanges $e^8$ through which are passed bolts $e^9$, and screws $e^{10}$ are passed through the plates $e^7$ into the bottom members of the springs $d$ to prevent said springs from moving forwardly.

I have also shown at $f$ and $g$ in Figs. 1 and 2, the front and rear axles of the vehicle on which the chassis or truck frame is mounted, and in Fig. 3 I have shown the front axle, and in Fig. 4 the rear axle, and the front axle $f$ is provided with bearing boxes $f^2$ which open forwardly and backwardly and in which are mounted split bearings $f^3$ in which are placed balls $f^4$ through which are passed spring shanks $h$ in which the bottom leaf or spring members $d^3$ of the springs $d$ are secured, as shown in Fig. 3. The spring shanks $h$ and balls $f^4$ are rigidly connected, and by means of this construction, a free rotary movement of the front end portions of the springs $d$ in the front axle $f$ is provided for, both laterally and vertically.

The inner sides of the boxes $f^2$ are closed by flexible caps $f^5$ through which the spring shanks $h$ pass, and the fronts or outer sides of said boxes are closed by caps $f^6$ bolted or otherwise secured to said boxes, as shown at $f^7$, and the caps $f^6$ aid in holding the split bearings $f^3$ in the boxes $f^2$, and said caps $f^6$ are provided with large central openings $f^8$ closed by flexible caps $f^9$ through which the spring shanks $h$ also pass.

The rear axle $g$ is provided with hangers $i$ rigidly connected therewith and provided at their lower ends with bearing boxes $f^2$ exactly the same in all respects as the bearing boxes $f^2$ connected with, or formed in connection with, the front axle $f$, and the bearing boxes $f^2$ of the rear axle $g$ are provided with spring shanks $h$ with which the rear ends of the bottom spring members $j^2$ of the rear side springs $j$ are connected, this construction being the same in all respects as the front end connections of the front side springs $d$.

The rear side springs $j$ are of the usual form, or consist of leaves or plates placed one upon another and decreasing in length from the bottom leaf or plate upwardly, and said springs are entirely inclosed in the side bars or rails $a$ and are pivoted therein at $j^3$, and are passed through box-shaped casings $m$ placed in said bars or rails, as shown in Figs. 4 and 6, and passed through the bottom of said box-shaped casings and through the sides of said bars or rails are tubular bearings $m^2$ provided at one end with nuts $m^3$ and at the opposite ends with hollow heads $m^4$, and mounted on the tubular bearings $m^2$ are plates $m^5$ having hub portions $m^6$ through which the bearings $m^2$ pass, and said bearings $m^2$ are provided in one side with perforations $m^7$, and are also preferably provided with sleeves $m^8$, and the perforations or holes $m^7$ are connected at the outer surfaces of the bearings $m^2$ by grooves $m^9$. The springs $j$ rest on the plates $m^5$ and are secured thereto by yoke-shaped keepers $n$ in the usual manner, and the object of making the bearings $m^2$ tubular in form and perforating them, is to provide means for lubricating the pivotal supports of the springs $j$, and the heads $m^4$ of the bearings $m^2$ are closed by caps $m^{10}$, or said heads may be provided with ordinary oil cups if desired.

At the front ends of the springs $j$, the two bottom leaves or plates $j^4$ thereof pass between roller bearings $o$ mounted in the bars or rails $a$, and said roller bearings pass transversely through said bars or rails and through reinforcing yoke-shaped frames $p$ placed therein. The roller bearings $o$ are made tubular in form and the construction thereof is the same as that of the bearings $m^2$ whereby said roller bearings serve as lubricators, and said roller bearings are provided with sleeves $o^2$ and with perforations or holes in one side thereof and with nuts $o^3$ at one end and hollow heads $o^4$ at the other end which are closed by caps $o^5$, but it will be understood that these lubricating bearings, as well as the lubricating bearings $m^2$, may be made in any desired manner, and in the operation of the vehicle, the front ends of the springs $j$ are movable freely through or between the roller bearings $o$, and the rear end portions thereof are rotatable both in horizontal and vertical planes within the bearing boxes $f^2$, and within certain limits.

Within the rear end portions of the reinforcing yoke-shaped frames or members $p$ are top and bottom guide plates $r$ which converge in a forward direction, and which serve to guide the front end portions of the springs $j$ between the bearings $o$ in the operation of assembling these parts, and which also serve to hold or retain said end portions of said springs in position between said bearings and to return them into proper position if at any time they should be withdrawn from between said bearings.

It will be understood, of course, that the means herein employed for connecting the springs $d$ and $j$ with the front and rear axles constitute what is known as universal joints, and this provides for both a horizontal and vertical rotary movement for said springs in their connection with said axles, and this facilitates the operation of said springs and adds to the strength and durability thereof, and by making the side bars or rails $a$ of the chassis or truck frame of sheet metal in the manner described, I effect a saving in material and weight, and at the same time produce stronger side bars or rails than those heretofore employed, and I also provide housings for the rear side springs which protect said springs from the elements and prevent rust from forming in connection therewith and dust and dirt from accumulating thereon, and the front springs $d$ are also partially protected, said springs being always covered by the front end portions of the side bars or rails, and being partially inclosed thereby when the vehicle is in operation.

There is also, as will be understood, an economy in my improved method of making the running boards $a^3$ in connection with the side bars or rails, and this also adds to the strength of said side bars or rails as well as to the strength of the running boards, and while I have shown and described the preferred form and construction of my improved chassis or truck frame for automobiles, it must be understood that changes in and modifications of the various details thereof, as herein shown and described, may be made, within the scope of the appended claims, without departing from the spirit of my invention or sacrificing its advantages.

From the foregoing description it will be seen that the front springs $d$ are cantaliver springs and the rear springs $j$ are double cantaliver springs, but my invention is not limited to the use of cantaliver springs at the front of the chassis or truck frame, and double cantaliver springs at the rear thereof, and either type of spring may be used at either the front or rear, or at both the front and rear, and my invention is also not limited to any particular means for securing said springs to the chassis or truck frame, and while I have described the means for connecting the springs with the axles, as a universal joint or coupling, it will be observed that the said joint or coupling is, in effect, a spherical seated spring joint arranged for axial motion.

Having fully described my invention what I claim as new and desire to secure by Letters Patent is:—

1. A chassis or truck frame for power driven vehicles having U-shaped side bars or rails, the open sides of which are directed downwardly, the central portion of said side bars or rails being closed at the bottom thereof, and said side bars or rails forming housings for the rear side springs which are mounted therein and connected with the rear axle.

2. A chassis or truck frame for power driven vehicles having U-shaped side bars or rails, the open sides of which are directed downwardly, the central portion of said side bars or rails being closed at the bottom thereof, and said side bars or rails forming housings for the rear side springs which are mounted thereon and connected with the rear axle, the front springs being also secured in the bottom portions of said bars or rails and being connected with the front axle.

3. A chassis or truck frame for power driven vehicles provided with hollow bars or rails which form housings for the rear side springs which are mounted therein and which have a universal joint connection with the rear axle, the front side springs being also supported in the front bottom portions of said bars or rails and having a universal joint connection with the front axle.

4. A chassis or truck frame for power driven vehicles having side bars or rails which are formed hollow, and in which the rear side springs are mounted, said springs having a central rotary pivotal support and the rear ends thereof having universal joint connections with the rear axle, and the front end portions thereof being passed between roller bearings.

5. A chassis or truck frame for power driven vehicles having side bars or rails which are formed hollow, and in which the rear side springs are mounted, said springs having a central rotary pivotal support and the rear ends thereof having universal joint connections with the rear axle, and the front end portions thereof being passed between roller bearings, the central pivotal supports of said springs and the roller bearings for the front end portions thereof being provided with means whereby they may be lubricated.

6. A chassis or truck frame for power driven vehicles having hollow side bars or rails open at the bottom, and rear end side springs mounted in said side bars or rails, and provided at their rear ends with a universal joint connection with the rear axle, the front end portions of said springs being passed between roller guides supported in said side bars or rails.

7. A chassis or truck frame for power driven vehicles having hollow side bars or rails open at the bottom, and rear end side springs mounted in said side bars or rails, and provided at their rear ends with a universal joint connection with the rear axle, the front end portions of said springs being passed between roller guides supported in said side bars or rails, and the front side springs being also supported in the bottom portions of said side bars or rails and having universal joint connections with the front axle.

8. A chassis or truck frame for power driven vehicles having side bars or rails which are U-shaped in cross section and which open downwardly, said side bars or rails forming housings for the rear side springs, and the front side springs being also supported in said side bars or rails, said front side springs having a universal joint connection with the front axle, and the rear side springs having a universal connection with hangers secured to the rear axle.

9. A chassis or truck frame for power driven vehicles having hollow side bars or rails in which the rear side springs are mounted, said springs being pivotally supported centrally thereof, and the rear end portions thereof having a universal joint connection with hangers secured to the rear axle, and the front end portions of said axle, and the front end portions of said springs being passed between roller bearings mounted in the side bars or rails.

10. A chassis or truck frame for power driven vehicles provided with side bars or rails and front side springs and rear side springs connected with said bars or rails at the front and rear ends thereof, said springs being connected with the front and rear axles by universal joints having central rotary spherical members, and said springs being provided with end portions or shanks which pass centrally through said spherical members, and to which said members are secured.

11. A chassis or truck frame for power driven vehicles provided with hollow side bars or rails which form housings which are open at their ends, and rear side springs secured in said housings and the rear ends of which are connected with the rear axle by universal joints having central spherical rotary members, and the rear ends of said springs being provided with end portions or shanks which pass centrally through said rotary members and to which said members are secured.

12. A chassis or truck frame for power driven vehicles provided with hollow side bars or rails which form housings which are open at their ends, and rear side springs secured in said housings and the rear ends of which are connected with the rear axle by universal joints having central spherical rotary members, and the rear ends of said springs being provided with end portions or shanks which pass centrally through said rotary members and to which said members are secured, said side bars or rails being also provided with side, front springs which are connected with the front axle by universal connected with the front axle by universal joints involving central rotary spherical members, and said springs being provided with end portions or shanks which pass centrally through said members and to which said members are secured.

13. A chassis or truck frame for power driven vehicles provided with side bars or rails which are U-shaped in cross section and which open downwardly and which form housings for the rear side springs which are mounted therein, and the outer ends of which are connected with the rear axle by universal joints involving central spherical rotary members, and said ends of said springs being provided with end portions or shanks which pass through said rotary members and to which said members are secured.

14. A chassis or truck frame for power driven vehicles provided with side bars or rails which are U-shaped in cross section and which open downwardly and which form housings for the rear side springs which are mounted therein, and the outer ends of which are connected with the rear axle by universal joints involving central spherical rotary members, and said ends of said springs being provided with end portions or shanks which pass through said rotary members and to which said members are secured and front side springs secured to said side bars or rails and connected with the front axle by universal joints involving central spherical rotary members, and said springs being provided with shanks which pass through said rotary members and to which said members are secured.

15. A chassis or truck frame for power driven vehicles provided with side bars or rails in connection with which the front and back side springs are connected, said front and back side springs being connected with the front and rear axles by universal joints having central rotary members, and said springs being provided with shanks which pass through and are secured in said members.

16. A chassis or truck frame for power driven vehicles provided with hollow side bars or rails open at the bottom, and rear side springs mounted in said rails and having central and front end bearings therein, the rear ends of said springs being connected with the rear axle by universal joints.

17. A chassis or truck frame for power driven vehicles provided with hollow side bars or rails in which the rear end side springs are placed, said rear end side springs being provided within said rails with central and front end movable bearings, and the rear ends of said springs being connected with the rear axle by universal joints, said rails being also provided with front side springs having universal joint connections with the front axle.

18. A chassis or truck frame for power driven vehicles provided with side rails and rear side springs connected with said rails and having central pivotal connections and sliding front end bearings, the rear end of said springs being connected with the rear axle by universal joints.

19. In an automobile construction, a chassis or truck frame having side bars or rails and rear end springs connected with said side bars or rails, and provided with movable central and front end bearings, the rear ends of said springs being connected with hangers suspended from the rear axle, and by means of universal joints.

20. A chassis or truck frame for power driven vehicles provided with side bars or rails formed from sheet metal and U-shaped in cross section, the opening therein being in the bottom thereof, said side bars or rails being provided on their outer sides with integral running boards and mud guards, and said side bars or rails also serving as housings for the rear side springs which are entirely inclosed therein except at their rear ends where they are connected with the rear axle of the vehicle.

In testimony that I claim the foregoing as my invention I have signed my name in presence of the subscribing witnesses this 18th day of October 1913.

HEBRON B. LAYMAN.

Witnesses:
  C. MULREANY,
  S. ANDREWS.